United States Patent
Bhardwaj et al.

(10) Patent No.: US 10,956,956 B2
(45) Date of Patent: Mar. 23, 2021

(54) SYSTEM, METHOD, AND COMPUTER READABLE MEDIUM FOR RECOMMENDATIONS BASED ON WEARABLE SENSORS

(71) Applicant: eBay Inc., San Jose, CA (US)

(72) Inventors: Anurag Bhardwaj, Sunnyvale, CA (US); Neelakantan Sundaresan, Mountain View, CA (US); Robinson Piramuthu, Oakland, CA (US)

(73) Assignee: eBay Inc., San Jose, CA (US)

( * ) Notice: Subject to any disclaimer, the term of this patent is extended or adjusted under 35 U.S.C. 154(b) by 1558 days.

(21) Appl. No.: 13/946,814

(22) Filed: Jul. 19, 2013

(65) Prior Publication Data
US 2014/0052567 A1 Feb. 20, 2014

Related U.S. Application Data

(60) Provisional application No. 61/684,675, filed on Aug. 17, 2012.

(51) Int. Cl.
*G06Q 30/00* (2012.01)
*G06Q 30/06* (2012.01)

(52) U.S. Cl.
CPC ................. *G06Q 30/0631* (2013.01)

(58) Field of Classification Search
CPC ............... G06Q 30/02; G06Q 30/0269; G06Q 30/0631; G06Q 30/0601–0645; G05B 19/00
USPC ...................... 705/26.1–27.2, 26.7
See application file for complete search history.

(56) References Cited

U.S. PATENT DOCUMENTS

| | | | |
|---|---|---|---|
| 5,907,407 A | 5/1999 | Atkinson et al. | |
| 6,070,269 A | 6/2000 | Tardif et al. | |
| 7,602,301 B1* | 10/2009 | Stirling | A61B 5/1124 340/573.1 |
| 8,798,363 B2 | 8/2014 | Bhardwaj et al. | |
| 2002/0045959 A1 | 4/2002 | Van Overveld | |
| 2004/0181168 A1* | 9/2004 | Plant | A61B 3/113 600/558 |

(Continued)

FOREIGN PATENT DOCUMENTS

| | | |
|---|---|---|
| AU | 2013302528 B2 | 9/2016 |
| CN | 1618395 A | 5/2005 |

(Continued)

OTHER PUBLICATIONS

McGee, Marianne Kolbasuk. 10 Wearable Devices to Keep Patients Healthy. Informationweek—Online Multi Media Healthcare Inc . . . May 16, 2012. (Year: 2012).*

(Continued)

*Primary Examiner* — Allison G Wood
(74) *Attorney, Agent, or Firm* — Fig. 1 Patents

(57) ABSTRACT

Apparatus and method for providing contextual recommendations based on user state are disclosed herein. In some embodiments, sensor data corresponding to at least one sensor included in an item worn by a user is received. A user state is determined based on the received sensor data. In response to a state change being satisfied by at least the user state, a recommendation is determined based on the user state and a profile associated with the user. The recommendation may be presented on an electronic mobile device associated with the user.

17 Claims, 6 Drawing Sheets

(56) References Cited

U.S. PATENT DOCUMENTS

| | | | | |
|---|---|---|---|---|
| 2007/0219059 | A1* | 9/2007 | Schwartz | A61B 5/0205 482/8 |
| 2007/0239549 | A1* | 10/2007 | LaFauci | G06Q 10/06 705/15 |
| 2008/0218310 | A1* | 9/2008 | Alten | A43B 5/00 340/5.8 |
| 2010/0023421 | A1 | 1/2010 | Wannier et al. | |
| 2011/0016001 | A1* | 1/2011 | Schieffelin | A61B 5/0059 705/14.66 |
| 2012/0265637 | A1* | 10/2012 | Moeggenberg | G06Q 30/06 705/26.8 |
| 2012/0295595 | A1* | 11/2012 | Gibori | G01N 33/4972 455/414.1 |
| 2013/0274040 | A1* | 10/2013 | Coza | G09B 19/0038 473/570 |
| 2014/0176565 | A1* | 6/2014 | Adeyoola | G06T 19/006 345/473 |

FOREIGN PATENT DOCUMENTS

| | | |
|---|---|---|
| CN | 102365043 A | 2/2012 |
| CN | 102625940 A | 8/2012 |
| CN | 104737082 A | 6/2015 |
| EP | 0801905 A2 | 10/1997 |
| GB | 2488237 A | 8/2012 |
| JP | 2010503914 A | 2/2010 |
| JP | 2010524090 A | 7/2010 |
| KR | 10-1997-0068924 A | 11/1997 |
| KR | 20010078475 A | 8/2001 |
| KR | 1020050003436 A | 1/2005 |
| KR | 1020050062773 A | 6/2005 |
| KR | 200418913 Y1 | 6/2006 |
| KR | 1020090094554 A | 9/2009 |
| KR | 20100065006 A | 6/2010 |
| KR | 20110087791 A | 8/2011 |
| KR | 20110109603 A | 10/2011 |
| WO | 2003/095020 A1 | 11/2003 |
| WO | 2004/032715 A2 | 4/2004 |
| WO | 2004/032715 A3 | 7/2004 |
| WO | 2008/033138 A1 | 3/2008 |
| WO | WO-2014028765 A2 | 2/2014 |
| WO | WO-2014028765 A3 | 2/2014 |

OTHER PUBLICATIONS

PrimeSense, Primesense 3D Sensors, https://www.i3du.gr/pdf/primesense.pdf.*
PrimeSense Unveiled World's Smallest 3D Sensor "Capri 1.25" At CES 2013, The Tech Journal, Jan. 12, 2013.*
Bury et al., Body-Metrics launches Kinect-powered body-sizing pods at Bloomingdales, Betakit, Aug. 9, 2012.*
Wong, How Microsoft's PrimeSense-based Kinect Really Works, ElectronicDesign, Mar. 16, 2011.*
"Australian Application Serial No. 2013302528, First Examiner Report dated Jun. 27, 2015", 2 pgs.
"Australian Application Serial No. 2013302528, Response filed Apr. 15, 2016 to First Examiner Report dated Jun. 27, 2015", 17 pgs.
"Korean Application Serial No. 2015-7006651, Notice of Preliminary Rejection dated Oct. 12, 2015", w/ English Translation, 14 pgs.
"Korean Application Serial No. 2015-7006651, Response filed Mar. 14, 2016 to Notice of Preliminary Rejection dated Oct. 12, 2015", 25 pgs.
"International Application Serial No. PCT/US2013/055190, International Preliminary Report on Patentability dated Feb. 26, 2015", 8 pgs.
"International Application Serial No. PCT/US2013/055190, International Search Report Mar. 11, 2014", 2 pgs.
"International Application Serial No. PCT/US2013/055190, Written Opinion dated Mar. 11, 2014", 6 pgs.

"me-ality.com—Welcome to Me-Ality! An easy way to shop!", [Online]. Retrieved from the Internet: <URL: http://www.me-ality.com/>, (Accessed Jan. 9, 2013), 2 pgs.
Cohn, Gabe, et al., "An Ultra-Low-Power Human Body Motion Sensor Using Static Electric Field Sensing", UbiComp' 12, (2012), 4 pgs.
Li, Hongqiang, et al., "Wearable Sensors in Intelligent Clothing for Measuring Human Body Temperature Based on Optical Fiber Bragg Grating", Optics Express, vol. 20 (11), [Online]. Retrieved from the Internet: <URL: http://ro.uow.edu.au/eispapers/298>, (May 9, 2012), 11740-11752.
Manzoor, Atif, et al., "Identifying Important Action Primitives for High Level Activity Recognition", Proceedings of the 5th European Conference on Smart Sensing and Context, (2010), 149-162.
Parkka, Juha, et al., "Activity Classification Using Realistic Data From Wearable Sensors", IEEE Transactions on Information Technology in Biomedicine,vol. 10,No. 1, (2006), 119-128.
"Canadian Application Serial No. 2,881,098, Response filed Dec. 15, 2016 to Office Action dated Jun. 28, 2016", 18 pgs.
"Chinese Application Serial No. 201380053868.1, Response filed Nov. 14, 2016 to Office Action dated Jun. 28, 2016", with English translation of claims, 14 pgs.
"Korean Application Serial No. 2015-7006651, Response filed Sep. 26, 2016 to Office Action dated Jul. 28, 2016", With English Translation of claims, 10 pgs.
"Canadian Application Serial No. 2,881,098, Office Action dated Jun. 28, 2016", 4 pgs.
"Chinese Application Serial No. 201380053868.1, Office Action dated Jun. 28, 2016", with English translation of claims, 14 pgs.
"Korean Application Serial No. 2015-7006651, Office Action dated Jul. 28, 2016", with English translation of claims, 4 pgs.
"Chinese Application Serial No. 201380053868.1, Office Action dated Mar. 8, 2017", with English translation of claims, 17 pgs.
"Chinese Application Serial No. 201380053868.1, Office Action Response dated May 23, 2017", with English translation of claims, 13 pgs.
"Korean Application Serial No. 2015-7006651, Office Action dated Jan. 24, 2017", with English translation of claims, 4 pgs.
"Korean Application Serial No. 2015-7006651, Office Action dated May 31, 2017", with English translation of claims, 18 pgs.
"Korean Application Serial No. 2015-7006651, Office Action Response dated Mar. 24, 2017", with English translation of claims, 10 pgs.
"Canadian Application Serial No. 2,881,098, Office Action dated May 5, 2017", 3 pgs.
"Korean Application Serial No. 2015-7006651, Response filed Jul. 31, 2017 to Office Action dated May 31, 2017", W/ English claims, 24 pgs.
Final Office Action with Dismissal of Amendment received for Korean Patent Application No. 10-2015-7006651, dated Apr. 5, 2018, 11 pages (5 pages of English translation and 6 pages of official copy).
Office Action received for Korean Patent Application No. 10-2015-7006651, dated Dec. 26, 2017, 7 pages (3 pages of official copy and 4 pages of English translation).
Response to Final Office Action filed on Feb. 23, 2018, for Korean Patent Application No. 10-2015-7006651, dated Dec. 26, 2017, 19 pages (15 pages of official copy and 3 pages of English pending claims).
Office Action received for Korean Patent Application No. 10-2018-7016029, dated Mar. 29, 2019, 16 pages (7 pages of official copy and 9 pages of English translation).
Office Action received for Korean Patent Application No. 10-2018-7016029, dated Sep. 5, 2018, 17 pages (8 pages of official copy and 9 pages of English translation).
Response to Office Action filed on May 24, 2019, for Korean Patent Application No. 10-2018-7016029, dated Mar. 29, 2019, 16 pages (11 pages of official copy and 5 pages of English translation).
Response to Office Action filed on Nov. 5, 2018, for Korean Patent Application No. 10-2018-7016029, dated Sep. 5, 2018, 24 pages (16 pages of official copy and 8 pages of English translation).
Office Action received for Korean Patent Application No. 10-2019-7037770, dated Feb. 1, 2020, 13 pages (6 pages of official copy and 7 pages of English translation).

(56) References Cited

OTHER PUBLICATIONS

Response to Office Action filed on Apr. 29, 2020, for Korean Application No. 10-2019-7037770, dated Feb. 1, 2020, 23 pages (20 pages of official copy and 3 pages of English translation of claims).
Office Action received for Canadian Patent Application No. 2,881,098, dated Apr. 19, 2018, 3 pages.
Office Action received for Canadian Patent Application No. 2,881,098, dated Nov. 8, 2018, 4 pages.
Response to Office Action filed on Feb. 22, 2019, for Canadian Patent Application No. 2,881,098, dated Nov. 8, 2018, 7 pages.
Response to Office Action filed on Jun. 22, 2018, for Canadian Patent Application No. 2,881,098, dated Apr. 19, 2018, 8 pages.
Response to Office Action filed on Oct. 30, 2017, for Canadian Patent Application No. 2,881,098, dated May 5, 2017, 7 pages.
Office Action received for Chinese Patent Application No. 201380053868.1, dated Aug. 31, 2017, 8 pages (3 pages of official copy and 5 pages of English translation).
Response to Office Action filed on Nov. 15, 2017, for Chinese Patent Application No. 201380053868.1, dated Aug. 31, 2017, 10 pages (7 pages of official copy and 3 pages of pending claims).

\* cited by examiner

SYSTEM, METHOD, AND COMPUTER READABLE MEDIUM FOR RECOMMENDATIONS BASED ON WEARABLE SENSORS

CROSS REFERENCE TO RELATED APPLICATIONS

This application claims priority to U.S. Provisional Patent Application No. 61/684,675 filed Aug. 17, 2012, the content of which is incorporated herein by reference in its entirety.

TECHNICAL FIELD

The present application relates generally to systems and methods for providing user targeted recommendations on a device.

BACKGROUND

Mobile communication devices, such as smartphones, enjoy widespread popularity due to their ability to perform a variety of functions, with new functionalities becoming available on a regular basis. A mobile communication device may include one or more sensors (e.g., gyroscope, accelerometer) to capture environment or state information associated with the device—often considered as a proxy for a user. However, because such sensors capture information based on actions taken on or to the device, the user may be required to carry the device, move the device, and/or interact with the device in a particular manner in order for the sensors to capture information. If the user places the device on a nearby table, for example, the device is unable to detect the user's activities.

Nevertheless, even when the device is not in use by the user, the device's processor capabilities, display capabilities, and/or ability to communicate with other processors, databases, or other resources are valuable, especially to other types of devices that do not have such capabilities.

BRIEF DESCRIPTION OF THE DRAWINGS

Some embodiments are illustrated by way of example and not limitations in the figures of the accompanying drawings, in which.

The headings provided herein are for convenience only and do not necessarily affect the scope or meaning of the terms used.

DETAILED DESCRIPTION

Described in detail herein is an apparatus and method for detecting a user's current activity, physical environment, and/or body state using articles of clothing and/or accessories embedded with sensors worn by the user. The sensor data is received by a computing device, such as a smartphone or tablet, for analysis and action. The computing device uses the remote sensor data to determine recommendations in context with the user's activity, environment and/or state. In some embodiments, the computing device presents recommendations of items for purchase that are in context with the received sensor data (e.g., articles of clothing in the user's size based on sensor data including the user's body measurements). In other embodiments, the computing device presents dietary, health, safety, or lifestyle recommendations based on the user's past behavior (or known guidelines) and the received sensor data. Articles of clothing and/or accessories including sensors can include, but are not limited to, hats, shirts, pants, jackets, belt, eye glasses, jewelry, wrist watches, shoes, and the like.

Various modifications to the example embodiments will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that the invention may be practiced without the use of these specific details. In other instances, well-known structures and processes are not shown in block diagram form in order not to obscure the description of the invention with unnecessary detail. Thus, the present disclosure is not intended to be limited to the embodiments shown, but is to be accorded the widest scope consistent with the principles and features disclosed herein.

Figure 1:
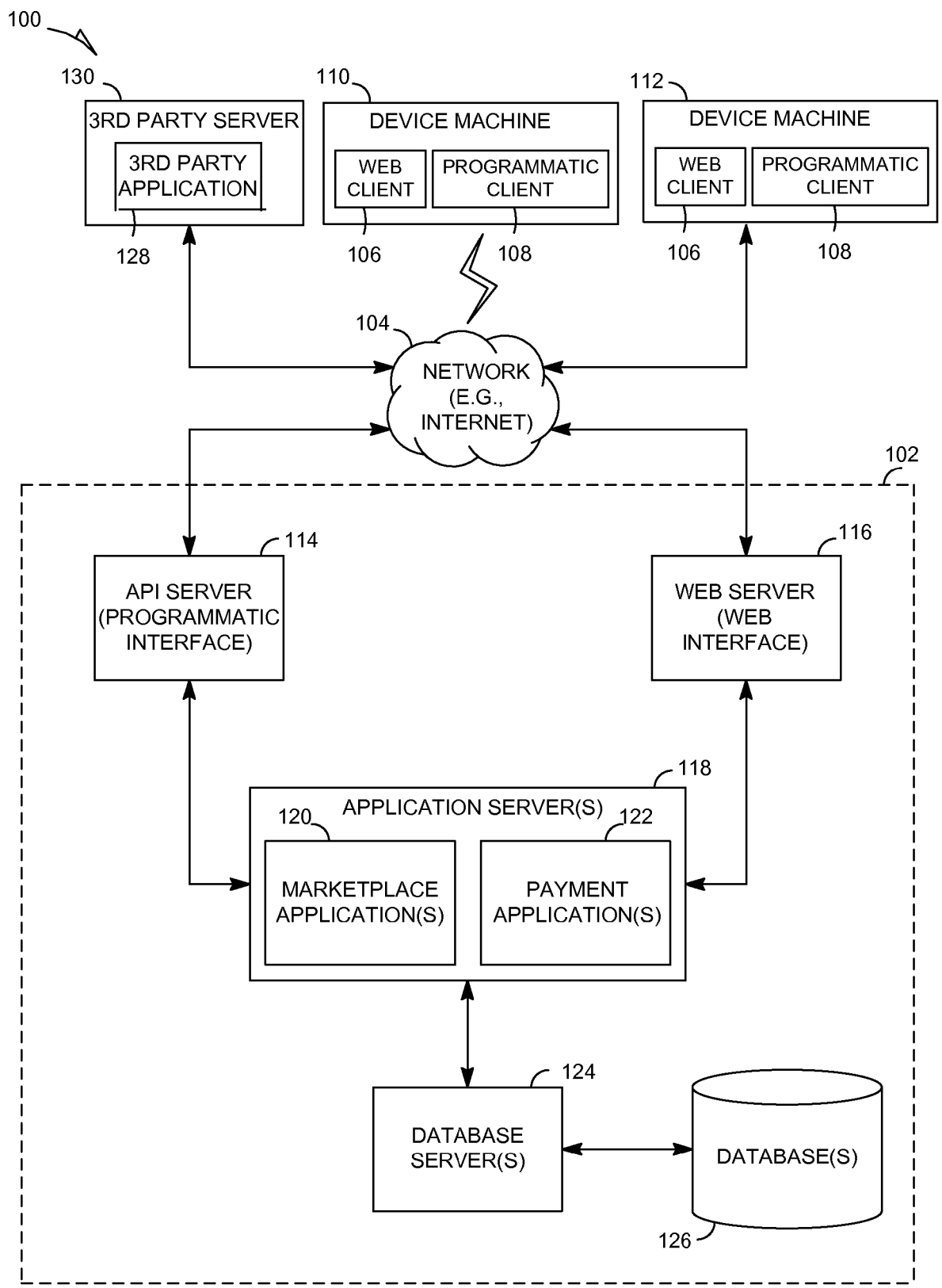
FIG. 1 illustrates a network diagram depicting an example system 100 for facilitating determination of and presentation of recommendations to users according to some embodiments.

FIG. 1 illustrates a network diagram depicting an example system 100 for facilitating determination of and presentation of recommendations to users according to some embodiments. A networked system 102 forms a network-based publication system that provides server-side functionality, via a network 104 (e.g., the Internet or Wide Area Network (WAN)), to one or more clients and devices. FIG. 1 further illustrates, for example, one or both of a web client 106 (e.g., a web browser) and a programmatic client 108 executing on device machines 110 and 112. In one embodiment, the publication system 100 comprises a marketplace system. In another embodiment, the publication system 100 comprises other types of systems such as, but not limited to, a social networking system, a matching system, an electronic commerce (e-commerce) system, and the like.

Each of the device machines 110, 112 comprises a computing device that includes at least a display and communication capabilities with the network 104 to access the networked system 102. The device machines 110, 112 comprise, but are not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. Each of the client machines 110, 112 may connect with the network 104 via a wired or wireless connection. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the device machines 110, 112 includes one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the device machines 110, 112, then this application is configured to locally provide the user interface and at least some of the functionalities with the application configured to communicate with the networked system 102, on an as needed basis, for data and/or processing capabilities not locally available (such as access to a database of items available for sale, to authenticate a user, to verify a method of payment, etc.). Conversely if the e-commerce site application is not included in a given one of the device machines 110, 112, the given one of the device machines 110, 112 may use its web browser to access the e-commerce site (or a variant thereof) hosted on the networked system 102. Although two device machines 110, 112 are shown in FIG. 1, more or less than two device machines can be included in the system 100.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of e-commerce functions and services to users that access networked system 102. E-commerce functions/services may include a number of publisher functions and services (e.g., search, listing, content viewing, payment, etc.). For example, the marketplace applications 120 may provide a number of services and functions to users for listing goods and/or services or offers for goods and/or services for sale, searching for goods and services, facilitating transactions, and reviewing and providing feedback about transactions and associated users. Additionally, the marketplace applications 120 may track and store data and metadata relating to listings, transactions, and user interactions. In some embodiments, the marketplace applications 120 may publish or otherwise provide access to content items stored in application servers 118 or databases 126 accessible to the application servers 118 and/or the database servers 124. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products or items (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102. In other embodiments, the payment applications 122 may be omitted from the system 100. In some embodiments, at least a portion of the marketplace applications 120 may be provided on the device machines 110 and/or 112.

Further, while the system 100 shown in FIG. 1 employs a client-server architecture, embodiments of the present disclosure is not limited to such an architecture, and may equally well find application in, for example, a distributed or peer-to-peer architecture system. The various marketplace and payment applications 120 and 122 may also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
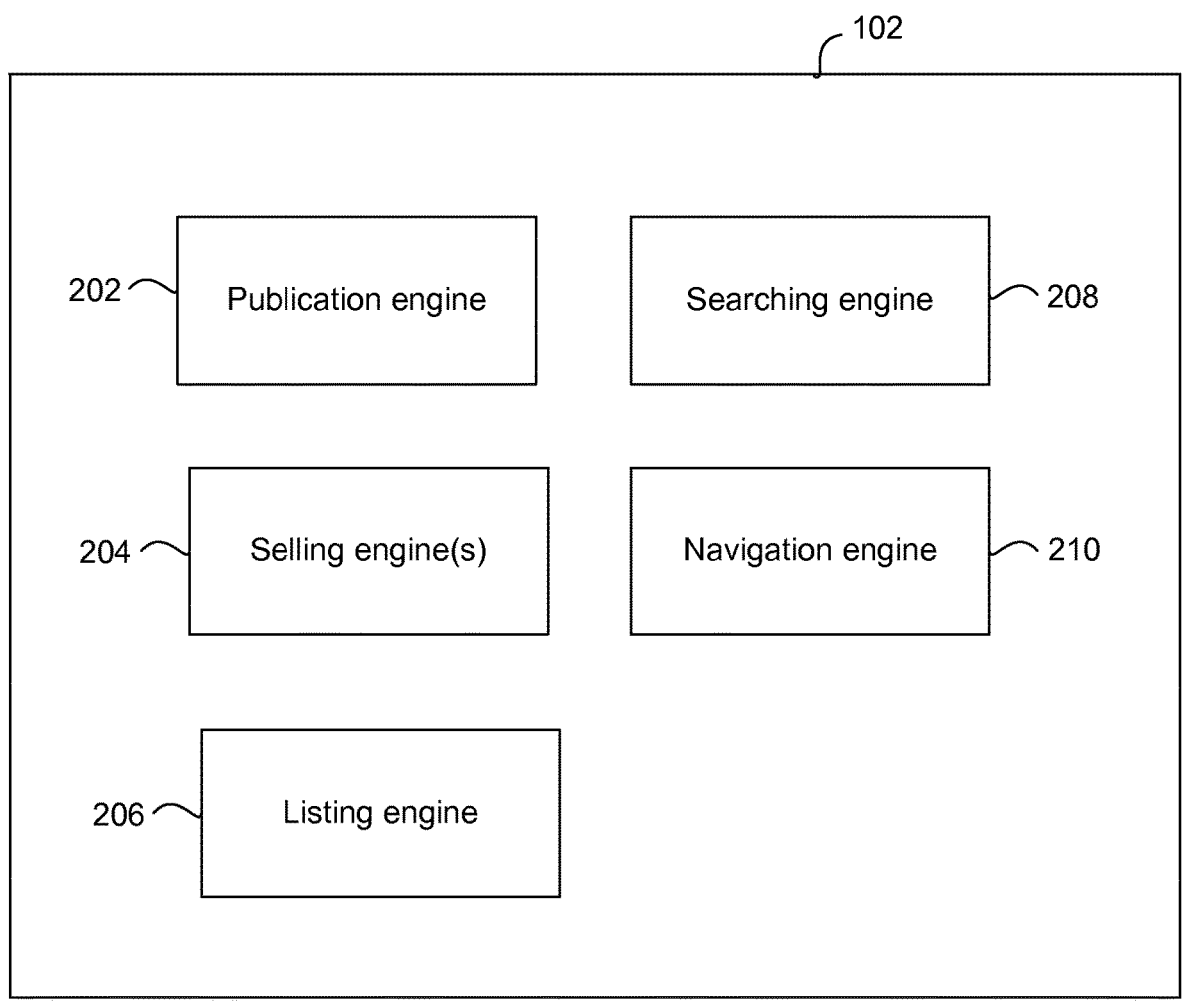
FIG. 2 illustrates a block diagram of additional details of the example system of FIG. 1 according to some embodiments.

FIG. 2 illustrates a block diagram showing components provided within the networked system 102 according to some embodiments. The networked system 102 may be hosted on dedicated or shared server machines (not shown) that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components may access one or more databases 126 via the data servers 128.

The networked system 102 may provide a number of publishing, listing, and/or price-setting mechanisms whereby a seller (also referred to as a first user) may list (or publish information concerning) goods or services for sale or barter, a buyer (also referred to as a second user) can express interest in or indicate a desire to purchase or barter such goods or services, and a transaction (such as a trade) may be completed pertaining to the goods or services. To this end, the networked system 102 may comprise at least one publication engine 202 and one or more selling engines 204. The publication engine 202 may publish information, such as item listings or product description pages, on the networked system 102. In some embodiments, the selling engines 204 may comprise one or more fixed-price engines that support fixed-price listing and price setting mechanisms and one or more auction engines that support auction-format listing and price setting mechanisms (e.g., English, Dutch, Chinese, Double, Reverse auctions, etc.). The various auction engines may also provide a number of features in support of these auction-format listings, such as a reserve price feature whereby a seller may specify a reserve price in connection with a listing and a proxy-bidding feature whereby a bidder may invoke automated proxy bidding. The selling engines 204 may further comprise one or more deal engines that support merchant-generated offers for products and services.

A listing engine 206 allows sellers to conveniently author listings of items or authors to author publications. In one embodiment, the listings pertain to goods or services that a user (e.g., a seller) wishes to transact via the networked system 102. In some embodiments, the listings may be an offer, deal, coupon, or discount for the good or service. Each good or service is associated with a particular category. The listing engine 206 may receive listing data such as title, description, and aspect name/value pairs. Furthermore, each listing for a good or service may be assigned an item identifier. In other embodiments, a user may create a listing that is an advertisement or other form of information publication. The listing information may then be stored to one or more storage devices coupled to the networked system 102 (e.g., databases 126). Listings also may comprise product description pages that display a product and information (e.g., product title, specifications, and reviews) associated with the product. In some embodiments, the product description page may include an aggregation of item listings that correspond to the product described on the product description page.

The listing engine 206 also may allow buyers to conveniently author listings or requests for items desired to be purchased. In some embodiments, the listings may pertain to goods or services that a user (e.g., a buyer) wishes to transact via the networked system 102. Each good or service is associated with a particular category. The listing engine 206 may receive as much or as little listing data, such as title, description, and aspect name/value pairs, that the buyer is aware of about the requested item. In some embodiments, the listing engine 206 may parse the buyer's submitted item information and may complete incomplete portions of the listing. For example, if the buyer provides a brief description of a requested item, the listing engine 206 may parse the description, extract key terms and use those terms to make a determination of the identity of the item. Using the determined item identity, the listing engine 206 may retrieve additional item details for inclusion in the buyer item request. In some embodiments, the listing engine 206 may assign an item identifier to each listing for a good or service.

In some embodiments, the listing engine 206 allows sellers to generate offers for discounts on products or services. The listing engine 206 may receive listing data, such as the product or service being offered, a price and/or discount for the product or service, a time period for which the offer is valid, and so forth. In some embodiments, the listing engine 206 permits sellers to generate offers from the sellers' mobile devices. The generated offers may be uploaded to the networked system 102 for storage and tracking.

Searching the networked system 102 is facilitated by a searching engine 208. For example, the searching engine 208 enables keyword queries of listings published via the networked system 102. In example embodiments, the searching engine 208 receives the keyword queries from a device of a user and conducts a review of the storage device storing the listing information. The review will enable compilation of a result set of listings that may be sorted and returned to the client device (e.g., device machine 110, 112) of the user. The searching engine 308 may record the query (e.g., keywords) and any subsequent user actions and behaviors (e.g., navigations).

The searching engine 208 also may perform a search based on the location of the user. A user may access the searching engine 208 via a mobile device and generate a search query. Using the search query and the user's location, the searching engine 208 may return relevant search results for products, services, offers, auctions, and so forth to the user. The searching engine 208 may identify relevant search results both in a list form and graphically on a map. Selection of a graphical indicator on the map may provide additional details regarding the selected search result. In some embodiments, the user may specify as part of the search query a radius or distance from the user's current location to limit search results.

The searching engine 208 also may perform a search based on an image. The image may be taken from a camera or imaging component of a client device or may be accessed from storage.

In a further example, a navigation engine 210 allows users to navigate through various categories, catalogs, or inventory data structures according to which listings may be classified within the networked system 102. For example, the navigation engine 210 allows a user to successively navigate down a category tree comprising a hierarchy of categories (e.g., the category tree structure) until a particular set of listing is reached. Various other navigation applications within the navigation engine 210 may be provided to supplement the searching and browsing applications. The navigation engine 210 may record the various user actions (e.g., clicks) performed by the user in order to navigate down the category tree.

Additional modules and engines associated with the networked system 102 are described below in further detail. It should be appreciated that modules or engines may embody various aspects of the details described below.

Figure 3:
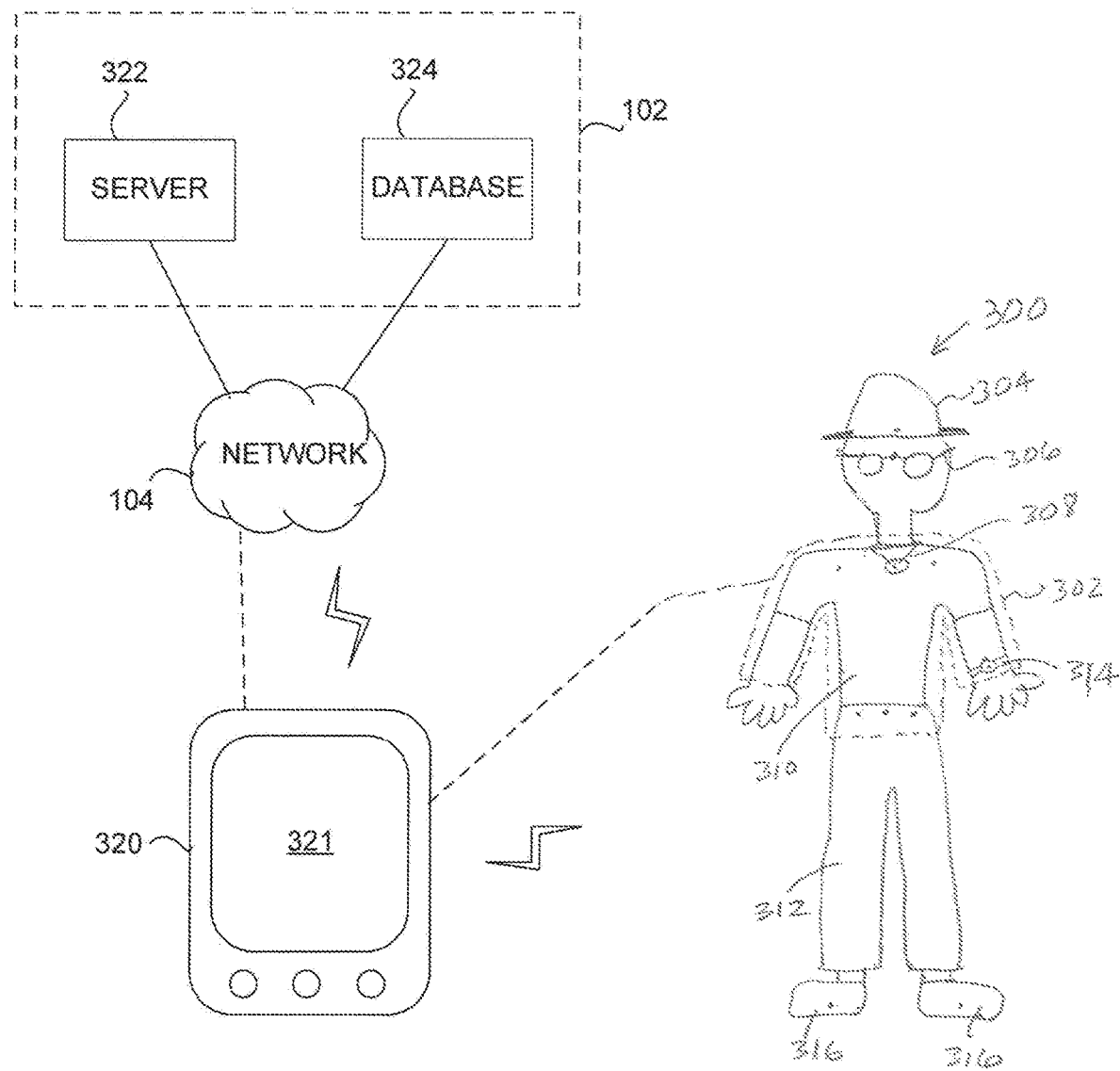
FIG. 3 illustrates an example simplified diagram showing a user adorned with a plurality of wearable sensors according to some embodiments.

FIG. 3 illustrates an example simplified diagram showing a user 300 adorned with one or more wearable sensors according to some embodiments. A plurality of wearable sensors (also referred to as sensors, sensor devices, wearable sensor devices, wearable sensor accessories, body sensors, wearable body sensors, remote body sensors, or remote sensors) are included in, but are not limited to, articles of clothing (a body measuring jacket 302, a hat 304, a shirt 310, pants 312, belt (not shown)), eye glasses 306, jewelry 308, a wrist watch 314, shoes 316, wristband, armband, accessories, and/or other items (collectively referred to as items wearable by the user 300 or wearable items) that can be worn by the user 300. Each of the plurality of wearable items includes one or more (embedded) sensors to detect one or more information about the user's 300 body, activity, and/or environment (e.g., body measurements, weight, number of steps taken over a given time period, environment). Each of the plurality of wearable items also includes one or more mechanisms to facilitate communication (e.g., transmission) of the detected sensor data to another device, such as a computing device 320. The communication may occur using Bluetooth, WiFi, near field communication (NFC), a wireless communication method, and/or via a wired connection. In some embodiments, communication between the wearable sensors and computing device 320 may occur when they are near each other, or the transmitting/receiving capabilities of one or both may be short-range (e.g., NFC or Bluetooth).

Each of the plurality of wearable items (with the possible exception of the body measuring jacket 302 as discussed in detail below) comprises an item that looks, feels, and functions like other items of the same type, so that the user 300 is likely to wear it as he/she normally would rather than having the sensor-embedded item be an additional item worn specifically for the purpose of capturing sensor data. For example, jewelry 308 looks, feels, and functions like jewelry that does not include sensor(s) and communication mechanisms.

The plurality of wearable items is shown worn simultaneously by the user 300 for purposes of providing a compact illustration. However, it is understood that the user 300 may only wear one or more items at any given time, and that the type(s) of wearable sensors may change from time to time (e.g., day to day, week to week). For instance, the user 300 may not wear the (same) shirt 310 every day while eye glasses 306 may be worn daily. The location and number of sensor(s) for each of the plurality of wearable sensors shown in FIG. 3 are also for illustration purposes only and should not be construed to limit the number and/or positioning of sensor(s) for any of the plurality of wearable sensors.

The computing device 320 (also referred to as a mobile device, display device, electronic mobile device, processing device, smartphone, tablet, and the like) comprises a receiving device for the sensor data provided by one or more of the plurality of wearable sensors. The computing device 320 has a wireless and/or wired connection with the plurality of wearable sensors. In response to receipt of the sensor data, the computing device 320 is configured to provide processing functions that may not be possible on the wearable sensors. The computing device 320 is also configured to communicate with a server 322 to obtain additional processing capacity and/or a database 324 to retrieve stored data, via a network 104, as needed. The computing device 320 communicates wirelessly and/or via a wired connection with the network 104. The computing device 320 includes a display 321 to present information, such as recommendations, to the user 300 in accordance with the sensor data.

The computing device 320 is similar to device machines 110 or 112 of FIG. 1. The server 322 is similar to database servers 124, API server 114, web server 116, and/or applications server 118 of FIG. 1. The database 324 is similar to databases 126 of FIG. 1.

In one embodiment, the plurality of wearable items/sensor 302-316 and the computing device 320 comprise an intra-body area network (IBAN) configured to provide recommendations or information triggered by one or more of the user's 300 body measurements, user's 300 current activity, user's 300 current non-activity, user's 300 physical environment, user's 300 physiological state, and/or other sensed data measured by the plurality of wearable sensors. In other embodiments, the plurality of wearable items/sensors 302-316, computing device 320, server 322, and database 324 can comprise the IBAN configured to provide the recommendations or information.

Figure 4:
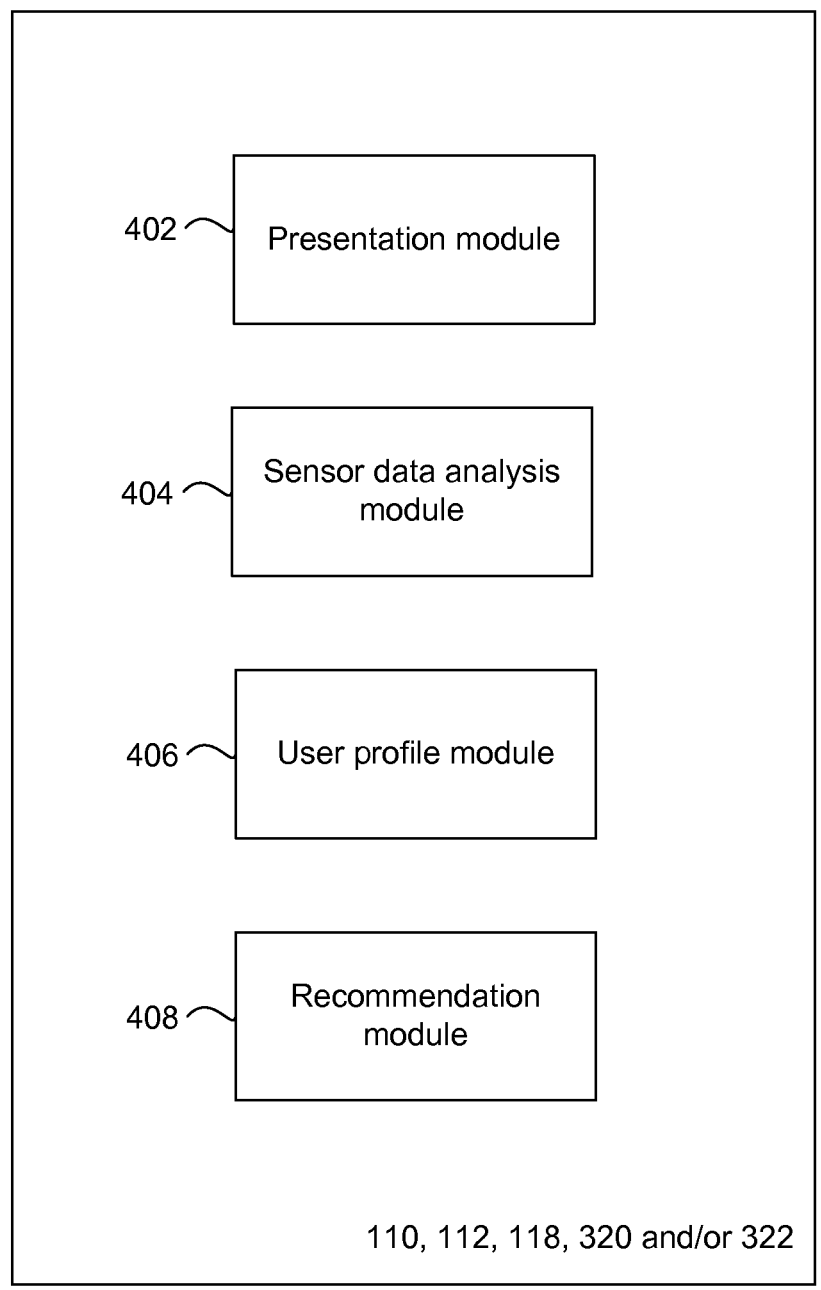
FIG. 4 illustrates a block diagram showing the recommendation determination functionalities and operations implemented in modules according to some embodiments.

FIG. 4 illustrates a block diagram showing the recommendation determination functionalities and operations implemented in modules according to some embodiments. The modules comprise one or more software components, programs, applications, apps, or other units of code base or instructions configured to be executed by one or more processors included in the application servers 118, device machine 110, device machine 112, computing device 320 and/or server 322 to provide the recommendation determination functionalities or operations described herein. In some embodiments, one or more of the modules are downloaded from an e-commerce site appropriate for the type of computing device. For example, if the computing device 320 (or device machines 110 or 112) comprises an iOS-type device (e.g., iPhone or the iPad), then the modules (which can be packaged as part of an app) can be downloaded from iTunes. Similarly, if the computing device 320 (or device machines 110 or 112) comprises an Android-type device, then the modules can be downloaded from the Android Marketplace. The computing device 320 has communication capabilities with servers or databases at a remote location (e.g., server 322, database 324) to access data and/or processing capabilities to facilitate providing targeted recommendations to the user 300.

In other embodiments, the modules may be hosted on the server 324 (or application servers 118) and no download of the modules is required on the computing device 320 (or device machines 110, 112). Instead, the modules may be accessed by computing devices 320 (or device machines 110, 112) using a web browser over the network 104. In still other embodiments, some of the modules may be included in the computing device 320 while other of the modules may be included in the server 324; the computing device 320 communicating with the server 322 to together provide the recommendations. Although modules 402-406 are shown as distinct modules in FIG. 4, it should be understood that modules 402-406 may be implemented as fewer or more modules than illustrated. It should also be understood that any of modules 402-406 may communicate with one or more components included in the system 100, such as server 322, database 324, computing device 320, database servers 124, application servers 118, device machine 110, or device machine 112. The modules include a presentation module 402, a sensor data analysis module 404, a user profile module 406, and a recommendation module 408.

Figure 5:
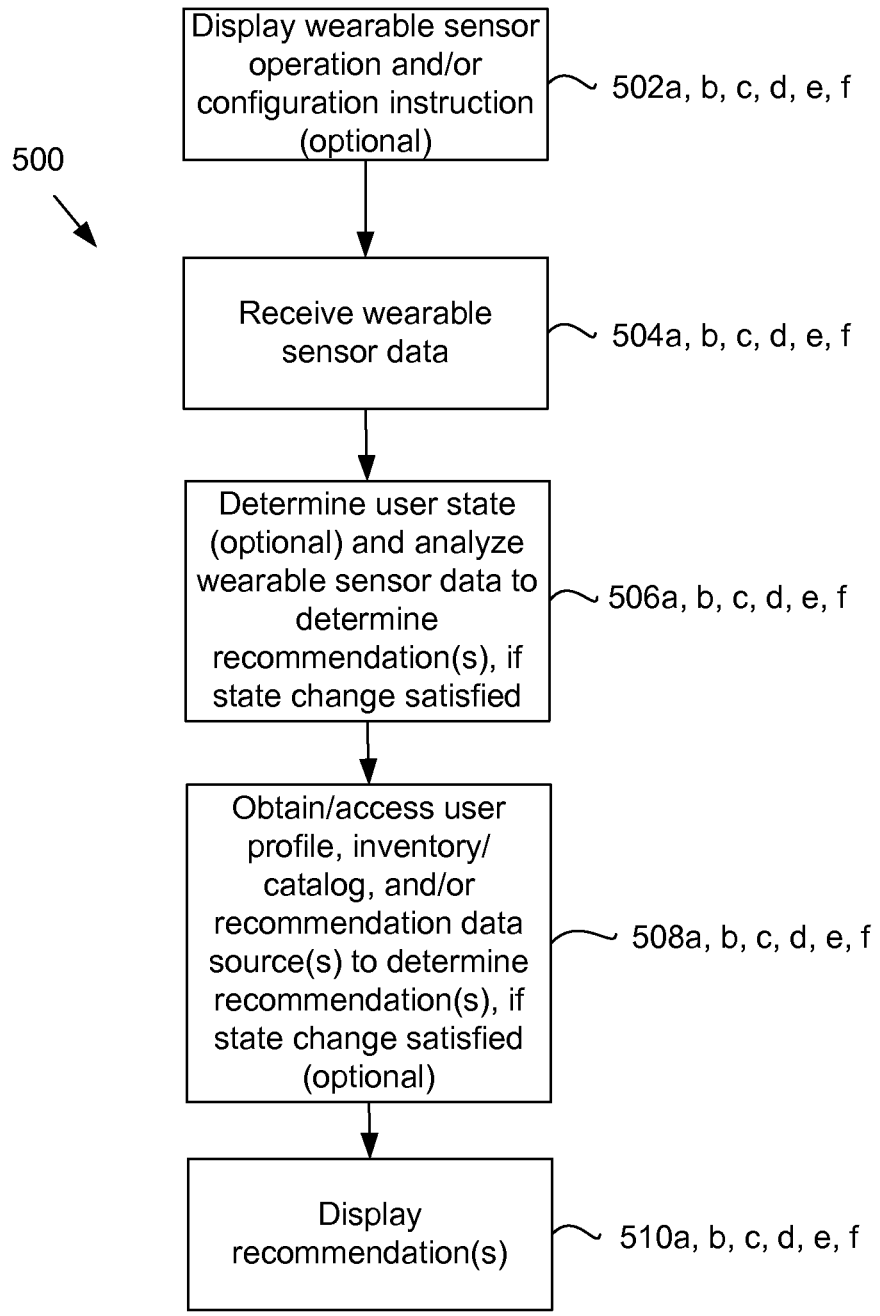
FIG. 5 illustrates an example flow diagram showing the recommendation determination functionalities or operations implemented by the modules of FIG. 4 according to some embodiments.

FIG. 5 illustrates an example flow diagram 500 showing the recommendation determination functionalities or operations implemented by the modules of FIG. 4 according to some embodiments. The operations of the flow diagram 500 may be performed by the device machine 110, device machine 112, a server included in the networked system 102 (e.g., API server 114, web server 116, or application servers 118), computing device 320, and/or server 322. FIGS. 4 and 5 are discussed below in conjunction with each other. A plurality of embodiments of the flow diagram 500 is discussed below.

In a first embodiment, the user 300 wears at least the body measuring jacket 302 and the computing device 320 provides one or more recommendations or information in response to the sensor data measured by the body measuring jacket 302. At a block 502a, the presentation module 402 is configured to display on the display 321 of the computing device 320 instructions or information about how to wear and/or operate the body measuring jacket 302. Such instructions/information can comprise one or more screens of text and graphical representations as well as requests for user 300 input so that the instructions/information can be tailored to the user's 300 needs. For example, the body measuring jacket 302 being used to obtain the user's body measurements (e.g., neck, arm length, chest, shoulder, waist, and hip measurements) as opposed to the user 300 using the body measuring jacket 302 to specify his/her preferred closeness/looseness of fit is inputted to the computing device 320 by the user 300. This in turn may determine the set of instructions/information provided to the user 300 to facilitate proper measurements. Alternatively, if operation/purpose of the body measuring jacket 302 is singular or otherwise known, then block 502a may be optional or omitted.

Next at a block 504a, the computing device 320 receives sensor data from the body measuring jacket 302 corresponding to the user 300's body. The sensor data comprises data corresponding to the dimensions of the user's 300 body and/or the preferred amount of closeness/looseness of fit for different parts of the user's 300 body relative to the user's 300 actual body dimensions. The body measuring jacket 302 may also be referred to as a smart jacket or body measurement jacket. Example configurations of the body measuring jacket 302 include, but are not limited to: a jacket embedded with a wire mesh (or grid) of contact or pressure sensors; a jacket having specifically located contact or pressure sensors; a jacket including a plurality of air chambers/channels, air pressure or volume sensors, and air inlet/outlet mechanism to control the amount of air in each of the air chambers/channels; a jacket including a pattern (e.g., a plaid pattern) and an image capture device to detect the deformation of the pattern due to the user's body contours/dimensions; and the like. The body measuring jacket 302 may also include buckles or other adjustment mechanism to conform different parts of the body measuring jacket 302 to the corresponding parts of the user's 300 body, and to facilitate the sensors to detect the difference between the jacket 302 at its default dimensions and at its user's 300 body conformed dimensions. The sensor data received by the computing device 320 corresponds to the type of sensors included in the body measuring jacket 302. The received sensor data may be raw sensor data or pre-processed sensor data (e.g., raw sensor data that has at least been minimally processed prior to transmission to computing device 320).

The body measuring jacket 302 may be worn by the user 300 specifically to obtain body measurements (or to specify preferred closeness/looseness of fit), and thus not worn ordinarily as an article of clothing. If the price of the body measuring jacket 302 is prohibitive, the body measuring jacket 302 is available for use in stores, and the like, the body measuring jacket 302 may be shared by a plurality of users and owned, for example, by a retailer wishing to promote its clothing or accessories. Similarly, such a retailer may also provide the computing device 320 to facilitate use of the body measuring jacket 302. An example of sensors associated with the body measuring jacket 302 (also referred to as a body measuring garment) to capture body measurements and/or preferred fit measurement may comprise one or more PrimeSense sensors manufactured by Primesense Americas of Los Altos, Calif. capable of three-dimensional (3D) depth sensing.

Once the computing device 320 receives the sensor data, the sensor data analysis module 404 is configured to analyze the received sensor data to determine one or more recommendations/information to provide to the user 300 (block 506a). The sensor data analysis module 404 may filter, normalize, remove noise, amplify, convert, or otherwise process the received sensor data to ready the data into a format suitable for analysis. In some embodiments, the sensor data analysis module 404 can determine recommendations/information based on the sensor data. In other embodiments, the sensor data analysis module 404 obtains additional data, and uses the additional data with the sensor data, to make the determination. Some or all of the analysis and determination may be performed by the server 322, for example, when the computing device 320 has insufficient processing capabilities.

To obtain additional data in order to make the determination, the sensor data analysis module 404 in conjunction with the user profile module 406 are configured to obtain or access user profile and/or recommendation data stored in a database (e.g., database 324, databases 126) (block 508a). The recommendation module 408 determines one or more recommendations from among a recommendation library that matches the sensor data corresponding to the user 300 from the body measuring jacket 302 and the user's 300 profile data. User profile data comprises, but are not limited to, user preferences, wish lists, shopping lists, the contents of the user's 300 wardrobe, and other information pertaining to the user 300. Recommendation data comprises, but are not limited to, physical store inventory, online store inventory (online marketplace or e-commerce site), and the like.

As an example, the recommendation module 408 determines the particular size of each article of clothing (e.g., tops, dresses, outerwear, etc.) and/or accessories (e.g., hat, belt, gloves etc.) in a (physical and/or online) store inventory that would fit the user 300 based on the user's 300 body measurements (or preferred fit preference) provided in the sensor data. The store inventory includes dimensions of each different sizes of each article of clothing and/or accessories offered by the store in order to compare against the user's dimensions. Then at a block 510a, the recommendation module 408 coordinates with the presentation module 402 to display information about the matching recommendation items on the display 321 of computing device 320. The information displayed about each of the matching recommendation items includes, but is not limited to, an item image, brand name, style name, size, price, description, fabric content, location within a given physical store where the item is available (in the case of the recommendation item being selected from a physical store inventory), an option to purchase via the computing device 320, and the like. With the information provided on the display 321, the user 300 avoids guessing at the proper size for a given clothing item of interest and/or having to try on the given clothing item in one, two, or more different sizes.

As another example, the recommendation module 408 determines the particular size of each article of clothing and/or accessories in a (physical and/or online) store inventory as discussed immediately above. However, rather than displaying information about each of the matching recommendation items, the recommendation module 408 is configured to consolidate or distill the size information to determine the proper size for each brand of article of clothing and/or accessories based on the user's 300 body measurements (or specified fit preference). Such information is displayed on the display 321 of the computing device 320.

As still another example, the recommendation module 408 is configured to additionally use information about the user's 300 existing wardrobe to determine recommendation items. In some embodiments, the computing device 320 (or other device) is used to photograph or image each item in the user's 300 wardrobe. The captured image of each item is processed to identify the color and/or pattern of the item, the type of item (e.g., top, dress, skirt, pants, etc.), and other item information. Additional details associated with capturing and identifying at least the color and pattern of articles of clothing/accessories are provided in U.S. patent application Ser. No. 13/631,833 filed Sep. 28, 2012. Such item information for all the wardrobe items is cataloged for later use, such as by the recommendation module 408.

The recommendation module 408 is configured to analyze, for instance, the colors of all the items in the user's 300 wardrobe to determine what color(s) the user 300 likes, the different shades of a given liked color in the user's wardrobe, and the like. Then the recommendation module 408 can determine matching recommendation items to be those items in the proper size given the user's 300 body measurements (or preferred fit preference) and which are also in a shade of a given liked color that is not in the user's wardrobe. If user's 300 wardrobe contains a number of blue tops, a matching recommendation item may also be in the color blue but in a shade of blue that the user 300 does not currently have in his/her wardrobe. Then at the block 510a, the matching recommendation items and corresponding item information are displayed on the display 321 of computing device 320.

When a store inventory is accessed in order to determine matching recommendation item(s), the store inventory may be maintained by the store/retailer. Thus, even if the entity associated with providing the recommendations is a different entity from the store/retailer, the recommendation module 408 is configured to access the store inventory without divulging information about the user 300 (such as the user identity).

At the block 510a, the presentation of matching recommendation item(s) can include presentation of texture or tactile information on the display 321. The display 321 may use capacitance at different frequencies to denote a texture on the top surface of the screen. Higher frequencies correspond to rougher textures. For example, a recommendation item can be clothing or accessory made of fur, silk, cashmere, or other material having noteworthy texture.

In a second embodiment, the body measuring jacket 302 is configured for taking body measurements/preferred fit measurements as discussed above and is additionally configured to show color and/or pattern so that the user 300 can see how each of a given color and/or pattern looks on him or her without having to try on a separate garment for each of the different given colors and/or patterns. At a block 502b, the computing device 320 (or a projection type of device) is configured to project color and/or pattern onto the body measuring jacket 302. Alternatively, the body measuring jacket 302 includes color and/or pattern configuration capability so that the body measuring jacket 302 itself generates and configures the different colors and/or patterns on its outer surface. The user 300 can try out different colors and/or patterns and indicate ones of interest to the computing device 320.

Blocks 504b and 506b are similar to blocks 504a and 506a, respectively. As discussed above for block 504a, at the block 504b, the computing device 320 receives sensor data (e.g., body measurement data and/or fit preference data) from the body measuring jacket 302. The computing device 320 also receives information about which of the color(s) and/or pattern(s) tried out on the body measuring jacket 302 are liked by the user 300. At the block 506b, as discussed above for block 506a, the sensor data analysis module 404 is configured to process the received sensor data, as necessary, and analyze them to determine recommendation(s) to present to the user 300.

Next at a block 508b, the sensor data analysis module 404 and recommendation module 408 are configured to obtain or access recommendation data sources (e.g., store inventories). Articles of clothing and/or accessories from among the store inventory(ies) that are in the user's size (based on the user's 300 body measurements or fit preference specified via the sensor data) and which are in the user's 300 liked color(s)/pattern(s) are deemed to be matching recommendation items by the recommendation module 408.

Information about the matching recommendation items is presented on the display 321 by the presentation module 402 at a block 510b. The information displayed about each of the matching recommendation items includes, but is not limited to, an item image, brand name, style name, size, color, price, description, fabric content, location within a given physical store where the item is available (in the case of the recommendation item being selected from a physical store inventory), an option to purchase via the computing device 320, and the like. The display 321 may also comprise a tactile display as discussed above and provide tactile texture information about one or more of the matching recommendation items.

In a third embodiment, the wearable sensors worn by the user 300 are included in one or more of the hat 304 and eye glasses 306. Each of the hat 304 and the eye glasses 306 includes at least an imaging sensor to capture images of the physical environment that the user 300 is in or the particular item that the user 300 is viewing at a given time.

Providing wearable sensor use instructions on the display 321 at a block 502c is optional.

At a block 504c, the computing device 320 receives sensor data from the hat 304 and/or eye glasses 306. The sensor data includes, but are not limited to, one or more images of the user's 300 physical environment and/or the item being viewed by the user 300. As an example, the user 300 may be standing in front of a bookstore or in a bookstore and is looking at a book. Sensors included in the hat 304 and/or eye glasses 306 captures one or more images of the book cover, the back of the book, or other parts of the book as the user 300 flips through the book.

Next at a block 506c, the sensor data analysis module 404 is configured to analyze the received sensor data to determine one or more recommendations/information to provide to the user 300. The sensor data analysis module 404 may determine that a pre-set state change or some other trigger has not occurred based on the current received sensor data, such that providing a recommendation is not suitable. The sensor data analysis module 404 may filter, normalize, remove noise, amplify, convert, or otherwise process the received sensor data to ready the data into a format suitable for analysis. In some embodiments, the sensor data analysis module 404 can determine recommendations/information based on the sensor data. In other embodiments, the sensor data analysis module 404 obtains additional data, and uses the additional data with the sensor data, to make the determination. Some or all of the analysis and determination may be performed by the server 322, for example, when the computing device 320 has insufficient processing capabilities.

Continuing the book example, the sensor data analysis module 404 performs text recognition on the received image sensor data to identify at least the book title, author, and possibly the book's unique International Standard Book Number (ISBN). Alternatively the sensor data analysis module 404 may scan for the book's bar code instead of textual identifier information. The sensor data analysis module 404 may be able to determine that the book is part of a particular series based on the title and author and without referring to another source, such as the bookstore's inventory.

Next at a block 508c, the recommendation module 408 in conjunction with the user profile module 406 are configured to obtain or access user profile information, particularly, the books that the user 300 owns. This information may be available directly on the computing device 320 because the user 300 purchased and downloaded electronic books on the computing device 320. The recommendation module 408 compares the book sensed by the wearable sensors against the user's 300 books identified in the user profile information. The recommendation module 408 may determine that the user 300 owns earlier book(s) in the same series as the book sensed by the wearable sensors, and additionally whether the user 300 has finished reading those earlier book(s) in the same series. If the earlier book(s) has not been read, then the recommendation triggered by the sensor data comprises a reminder that the user 300 owns the earlier book(s) in the same series and to finish reading those book(s) before purchasing the book that the user 300 is currently looking at. Such recommendation is displayed on the display 321 of computing device 320 at a block 510*c*. Conversely, if the earlier book(s) has already been read, the recommendation comprises encouraging the user 300 to purchase the sensed book and providing information to facilitate a purchase, such as providing a purchase icon, a coupon, a list of booksellers offering the book at a lower price, etc., on the computing device 320.

If the sensor data analysis module 404 is unable to determine whether the sensed book is part of a series based on title and author, the recommendation module 308 obtains or accesses one or more resources at the block 508*c*. The bookstore's inventory includes information about the sensed book relative to other books, such as series information. The recommendation module 408 now has the book series information to compare against the user's 300 books and make a recommendation on the computing device 320 as discussed above.

In a fourth embodiment, the wearable sensors are included in the shirt 310, pants 312, watch 314, wristband (not shown), armband (not shown), and/or shoes 315. Each of the shirt 310, pants 312, watch 314, wristband, armband, and shoes 315 may include an accelerometer, movement, gyroscope, moisture, temperature, and/or contact sensors to detect when it is being worn by the user 300, the type of physical activity being engaged by the user 300, and/or the physiological state of the user 300. For instance, in response to the sensor data being indicative of the user 300 engaging in exercise, the computing device 320 provides music recommendations in response to the exercise trigger.

UP by Jawbone of San Francisco, Calif. is an example wristband including wearable sensors to track user movement that can be used with an associated interface to manually enter other information such as foods eaten or user moods. An example armband may be BodyMedia by BodyMedia, Inc. of Pittsburgh, PA that includes a plurality of different sensors to measure movement, number of steps, sweat (galvanic skin response), skin temperature, and body heat flux. Basis Band by Basis Science, Inc. of San Francisco, Calif. is an example wrist watch that includes a plurality of sensors on the backside of the watch face. The sensors monitor optical blood flow to determine heart rate, includes an accelerometer to measure body movement (activity level, sleep quality), monitor perspiration, and skin temperature measurements. Optical fiber Bragg grating (FBG)-based sensors can be integrated into textiles, such as shirt 310, pants 312, or shoes 315, to monitor body temperature. See H. Li, H. Yang, E. Li, Z. Liu, & K. Wei, "Wearable sensors in intelligent clothing for measuring human body temperature based on optical fiber Bragg grating," *Optics Express*, Vol. 20 (11), 11740-11752, 2012 (available at http://ro.uow.edu.au/cgi/viewcontent.cgi?article=1303&context=eispapers). Where ultra-low power consumption is relevant, such as clothing or accessories with limited physical dimensions or low weight requirements, an example of wearable sensors having ultra-low power requirements is discussed in G. Cohn, S. Gupta, T. Lee, D. Morris, J. Smith, M. Reynolds, D. Tan, & S. Patel, "An ultra-low-power human body motion sensor using static electric field sensing," *Ubi Comp* '12, Sep. 5-8, 2012, Pittsburgh, Pa. (available at http://research.microsoft.com/en-us/um/redmond/groups/cue/publications/CohnUbicomp2012_SEF.pdf).

Providing wearable sensor use instructions on the display 321 at a block 502*d* is optional.

At a block 504*d*, the computing device 320 receives sensor data from the shirt 310, pants 312, watch 314, wristband, armband, and/or shoes 315. The sensor data includes, but are not limited to, an indication that the item is being worn by the user 300, time/date stamp, item or sensor identifier, type of physical activity (e.g., running, walking, sleeping, sitting, eating, cycling, in a motor vehicle, etc.), and/or user physiological state (e.g., level of perspiration, skin temperature, heart rate, etc.). The sensor data received by the computing device 320 permits, for example, the sensor data analysis module 404 at a block 506*d* to determine that certain of the worn items are exercise gear (e.g., shirt 310, pants 312, shoes 315, wristband, armband) (using respective item or sensor identifier to look-up previously cataloged information about the wearable sensors) and that they are being worn together at the same time by the user 300 (using the time/date stamp and indication of being worn). Thus, it appears that the user 300 has put on exercise clothes and is wearing sneakers in order to exercise. As another example, the received sensor data may permit the sensor data analysis module 404 to determine that the user 300 is wearing the particular item(s) including the wearable sensors to generally monitor his/her activity or physiological state for health reasons.

The sensor data analysis module 404 may filter, normalize, remove noise, amplify, convert, or otherwise process the received sensor data to ready the data into a format suitable for analysis. The received sensor data may comprise raw data indicative of, for instance, amount of movement or skin temperature but not necessarily the type of activity or physiological state corresponding to such raw data. In this case the sensor data analysis module 404 provides the conversion or interpretation of the received sensor data into contextual information such as identification of the user activity or physiological state. Examples of suitable algorithmic methods to determine activity or physiological state from wearable sensor data are provided in J. Parkka, M. Ermes, P. Korpipaa, J. Mantyjarvi, J. Peltola, & I. Korhonen, "Activity classification using realistic data from wearable sensors," *IEEE Transactions on Information Technology in Biomedicine*, Vol. 10, No. 1, January 2006, 119-128 (available at http://cens.ucla.edu/~mhr/cs219/context/parkka06.pdf) or A. Manzoor, C. Villalonga, A. Calatroni, H. Truong, D. Roggen, S. Dustdar, & G. Troster, "Identifying important action primitives for high level activity recognition," *Smart Sensing and Context Lecture Notes in Computer Science*, Volume 6446, 2010, 149-162 (available at http://hydra.infosys.tuwien.ac.at/staff/manzoor/papers/5_EuroSSC2010.pdf). Conversely the received sensor data may comprise data that has already been contextualized.

In some embodiments, the sensor data analysis module 404 can determine recommendations/information based on the sensor data alone. In other embodiments, the sensor data analysis module 404 obtains additional data, and uses the additional data with the sensor data, to make the determination. Some or all of the analysis and determination may be performed by the server 322, for example, when the computing device 320 has insufficient processing capabilities.

Next at a block 508*d*, the recommendation module 408 in conjunction with the user profile module 406 are configured to obtain or access user profile information, particularly, the music that the user 300 owns. This information may be available directly on the computing device 320 because the user 300 purchased and downloaded songs/albums on the computing device 320. The recommendation module 408 determines one or more songs in the user's 300 music library to recommend for play during physical activity. The songs may be selected based on the type of physical activity being engaged by the user 300. A recommended playlist for running may differ from a playlist for walking. Alternatively the recommendation module 408 may access the user's 300 music library and an online music store (e.g., iTunes) to recommend music for purchase that are similar to the user's 300 tastes and which are suitable for the type of physical activity available on the online music store.

The music recommendations are presented on the display 321 of the computing device 320 at a block 510*d*.

In some embodiments, the sensor data analysis module 404 (in conjunction with the user profile module 406) may determine that the received sensor data alone (or in conjunction with the user profile information) do not represent a pre-set state change or trigger that warrants a recommendation. In which case block 510*d* may not occur. For example, continuing the music example, if the sensor data indicates that the user 300 is cycling, then listening to music (typically using earbuds) during such activity is not advisable. Accordingly, music recommendations may not be provided.

In a fifth embodiment, the wearable sensors are included in shoes 316, pants 312, watch 314, wristband, and/or armband configured to detect the amount of user's 300 physical activity and/or weight change. The recommendations provided to the user 300 may comprise food, diet, weight, and/or fitness related recommendations. Examples of clothing, watch, wristband, or armband including wearable sensors are discussed above with in connection with blocks 502*d*-510*d*.

Providing wearable sensor use instructions on the display 321 at a block 502*e* is optional.

At a block 504*e*, the computing device 320 is configured to receive sensor data from the shoes 316, pants 312, watch 314, wristband, and/or armband. For example, the shoes 316 include pressure sensors and/or pedometers located in or below the soles to detect the number of steps taken and/or the wearer's weight. The greater the pressure detected for a given wearer for a given physical activity (e.g., standing, running, walking), the greater the wearer's weight. The shoes 316 do not need to necessarily include sensors capable of capturing exact weight measurement. Instead, changes in the sensed pressure over time are sufficient to determine that the wearer's weight is increasing or decreasing. As another example, the pants 312 can include a group of contact or pressure sensors located circumferentially around the waistband to sense how much of the waistband is in contact with the user's 300 waist and/or how much pressure contact the waistband is with the user's 300 waist. The greater the pressure sensed, the tighter the pants 312 are on the user 300 and correspondingly, is indicative of weight gain. The pants 312 can also include a pedometer to detect the number of steps taken by the user 300. As another example, watch 314, wristband, and/or armband may include motion sensors to detect eating and the user 300 may manually enter kind and amount of foods consumed, so that food intake (calories consumed) may be tracked relative to amount/type of physical activity.

Next at a block 506*e*, the sensor data analysis module 404 is configured to analyze the received sensor data to determine recommendations to provide on the computing device 320 in response to the available user activity and body data. The sensor data analysis module 404 may filter, normalize, remove noise, amplify, convert, or otherwise process the received sensor data to ready the data into a format suitable for analysis. The received sensor data may comprise raw data indicative of, for instance, amount of movement or skin temperature but not necessarily the type of activity or physiological state corresponding to such raw data. In this case the sensor data analysis module 404 provides the conversion or interpretation of the received sensor data into contextual information such as identification of the user activity or physiological state. Examples of suitable algorithmic methods to determine activity or physiological state from wearable sensor data are provided in J. Parkka, M. Ermes, P. Korpipaa, J. Mantyjarvi, J. Peltola, & I. Korhonen, "Activity classification using realistic data from wearable sensors," *IEEE Transactions on Information Technology in Biomedicine*, Vol. 10, No. 1, January 2006, 119-128 (available at http://cens.ucla.edu/~mhr/cs219/context/parkka06.pdf) or A. Manzoor, C. Villalonga, A. Calatroni, H. Truong, D. Roggen, S. Dustdar, & G. Troster, "Identifying important action primitives for high level activity recognition," *Smart Sensing and Context Lecture Notes in Computer Science*, Volume 6446, 2010, 149-162 (available at http://hydra.infosys.tuwien.ac.at/staff/manzoor/papers/5_EuroSSC2010.pdf). Conversely the received sensor data may comprise data that has already been contextualized.

In some embodiments, the sensor data analysis module 404 can determine recommendations/information based on the sensor data alone. In other embodiments, the sensor data analysis module 404 obtains additional data, and uses the additional data with the sensor data, to make the determination. Additional data may comprise, for example, previously sensed pressure, contact, or movement data for the user 300 so that relative weight change or trend can be determined. Some or all of the analysis and determination may be performed by the server 322, for example, when the computing device 320 has insufficient processing capabilities.

The sensor data analysis module 404 may filter, normalize, remove noise, amplify, convert, or otherwise process the received sensor data to ready the data into a format suitable for analysis.

At a block 508*e*, the recommendation module 408 is configured to determine appropriate recommendation(s) based on the received sensor data. As an example, the sensor data indicates that the user 300 is not engaging in sufficient physical activity and/or is gaining weight. Lower calorie food recommendations may thus be made on the display 321 (block 510*e*) when the user 300 is in a grocery store or dining out (geo-location information obtained using the global positioning satellite (GPS) chip included in the computing device 320). The recommendation module 408 accesses one or more food resources (e.g., manufacturer-provided calorie information, restaurant menus, food caloric websites) to identify and select lower calorie foods, perhaps relative to foods that the user 300 has purchased in the past.

As another example, the sensor data indicates that the user 300 has taken a certain number of total steps in the shoes 316. The cumulative total number of steps exceeds a pre-determined threshold value, the pre-determined threshold value set at a number of steps at which the shoes 316 is getting old and should be replaced. The recommendation module 408 accesses one or more shoe store inventories to select one or more replacement shoes that are available for purchase. The computing device 320 provides the approximate wear life left for the shoes 316, purchase interfaces, replacement shoe descriptions/images/reviews, and the like As still another example, the recommendation module 408 extrapolates the user's 300 weight (or amount of weight gain) based on the current weight gain trend and assuming no changes to diet and physical activity level. The extrapolation information is provided on the computing device 320. As another example, the recommendation module 408 recommends physical activities and the amount of time that such activities should be performed to maintain or lose weight. Such recommendations can be dynamically adjusted in accordance with changes to the user's 300 physical activity level, weight/pant snugness, food buying pattern, and the like.

In some embodiments, the sensor data analysis module 404 (in conjunction with the user profile module 406) may determine that the received sensor data alone (or in conjunction with the user profile information) do not represent a state change or trigger that warrants a recommendation. In which case block 510e may not occur. For example, if weight gain above a certain threshold is a state change or trigger to provide a recommendation, but the sensor data alone (or in conjunction with previously received sensor data) indicates that the user 300 is maintaining or losing weight or that the weight gain is below the threshold, then recommendations relating to weight gain need not occur.

In a sixth embodiment, the wearable sensors are included in one or more of the hat 304, eye glasses 306, jewelry 308, wrist watch 314, shirt 310, armband, wristband, or pants 312. The wearable sensors include one or more sensors to detect user's 300 movement and/or body physiology indicative of, for example, excessive alcohol consumption or sudden illness making the user 300 unfit to operate a motor vehicle or engage in certain activity. The wearable sensors may also include one or more sensors to detect the physical environment that the user 300 is in, such as being in the driver's seat of a motor vehicle vs. being at home.

Providing wearable sensor use instructions on the display 321 at a block 502f is optional.

At a block 504f, the computing device 320 receives sensor data from one or more of the wearable sensors capable of detecting the user's 300 movement or body physiology and physical environment. The shirt 310 and/or pants 312, for example, may include gyroscope or accelerometer sensors to detect the user's movements and a pattern of movement indicative of impairment in motor functions. The jewelry 308, as another example, may include a chemical detection sensor capable of detecting alcohol fumes and the amount of alcohol fumes from the user's 300 mouth and/or drinks put up to the user's 300 mouth. The eye glasses 306, as another example, may include a microphone to capture the user's 300 voice in order to determine slurring of speech and an image sensor to determine the user's 300 physical environment. Examples of clothing, watch, wristband, or armband including wearable sensors are discussed above with in connection with blocks 502d-510d.

Next at a block 506f, the sensor data analysis module 404 is configured to analyze the received sensor data to determine whether the user 300 is in a state that warrants taking action. The sensor data analysis module 404 may filter, normalize, remove noise, amplify, convert, or otherwise process the received sensor data to ready the data into a format suitable for analysis. The received sensor data may comprise raw data indicative of, for instance, amount of movement or skin temperature but not necessarily the type of activity or physiological state corresponding to such raw data. In this case the sensor data analysis module 404 provides the conversion or interpretation of the received sensor data into contextual information such as identification of the user activity or physiological state. Examples of suitable algorithmic methods to determine activity or physiological state from wearable sensor data are provided in J. Parkka, M. Ermes, P. Korpipaa, J. Mantyjarvi, J. Peltola, & I. Korhonen, "Activity classification using realistic data from wearable sensors," *IEEE Transactions on Information Technology in Biomedicine*, Vol. 10, No. 1, January 2006, 119-128 (available at http://cens.ucla.edu/~mhr/cs219/context/parkka06.pdf) or A. Manzoor, C. Villalonga, A. Calatroni, H. Truong, D. Roggen, S. Dustdar, & G. Troster, "Identifying important action primitives for high level activity recognition," *Smart Sensing and Context Lecture Notes in Computer Science*, Volume 6446, 2010, 149-162 (available at http://hydra.infosys.tuwien.ac.at/staff/manzoor/papers/5_EuroSSC2010.pdf). Conversely the received sensor data may comprise data that has already been contextualized.

In some embodiments, the sensor data analysis module 404 can determine recommendations/information based on the sensor data alone. In other embodiments, the sensor data analysis module 404 obtains additional data, and uses the additional data with the sensor data, to make the determination. Some or all of the analysis and determination may be performed by the server 322, for example, when the computing device 320 has insufficient processing capabilities.

At a block 508f, for example, if the recommendation module 408 determines that the user 300 is exhibiting signs of intoxication—slurred speech, weaving walking pattern, alcohol fumes, payment of large amount of alcohol, etc.—an appropriate recommendation may be to suggest calling a taxi rather than driving on the computing device 320. The taxi suggestion can include providing the phone number to call the taxi or even an auto dial option so as to make calling a taxi as easy as possible for the user 300. Conversely, if the recommendation module 408 determines that although the user 300 has signs of intoxication, the user 300 is a passenger in a motor vehicle (the user 300 is not driving), then a suggestion to call a taxi is not necessary and perhaps a restaurant suggestion (to dilute the effects of the alcohol) is more appropriate. As another example, if the recommendation module 408 determines that the user 300 is exhibiting signs of loss of motor coordination, a sudden fall, or other sudden change in movement/physical state that is not consistent with normal behavior, then a sudden illness may have occurred and an ambulance (or nearby person or user's 300 spouse) should be alerted. At a block 510f, the presentation module 402 can facilitate calling medical personnel or a loved one, or even emitting a noise or alert message to evoke a response from the user 300 or a nearby person.

In some embodiments, the sensor data analysis module 404 (in conjunction with the user profile module 406) may determine that the received sensor data alone (or in conjunction with the user profile information) do not represent a state change or trigger that warrants a recommendation. In which case block 510f may not occur. For example, if the received sensor data indicates that the user 300 is not intoxicated or ill (e.g., below a threshold), then no recommendation may be necessary at that point in time. Subsequent sensor data may be monitored to note trends (e.g., alcohol consumption is increasing within a certain time period, or balance seems worse than before) for future recommendations.

It is understood that other physical environments may evoke a different recommendation response for the same detected movement/body physiology. For example, the user 300 being out in the wild or in an airplane calls for different suggestions than when the user is in a motor vehicle.

Accordingly, a variety of information captured by sensors included in clothing and/or accessories that the user 300 (normally) wears are communicated to the computing device 320, such as the user's 300 smartphone or tablet, for analysis and response. In response, the computing device 320 alone or in conjunction with user profile data and/or other data source(s) formulates an action that is tailored to the user 300 and which is context specific to the user's current physical activity, physical environment, physiological state, and/or user profile. If the sensor data (or in conjunction with the user profile information) satisfies a state change or trigger, then the computing device 320 is configured to present one or more recommendations/notifications to the user 300. Conversely, if the state change or trigger is not satisfied, then the received sensor data may be stored for later use (and other data may be updated accordingly, such as the user profile information), but no recommendation may be presented in response to that received sensor data.

Figure 6:
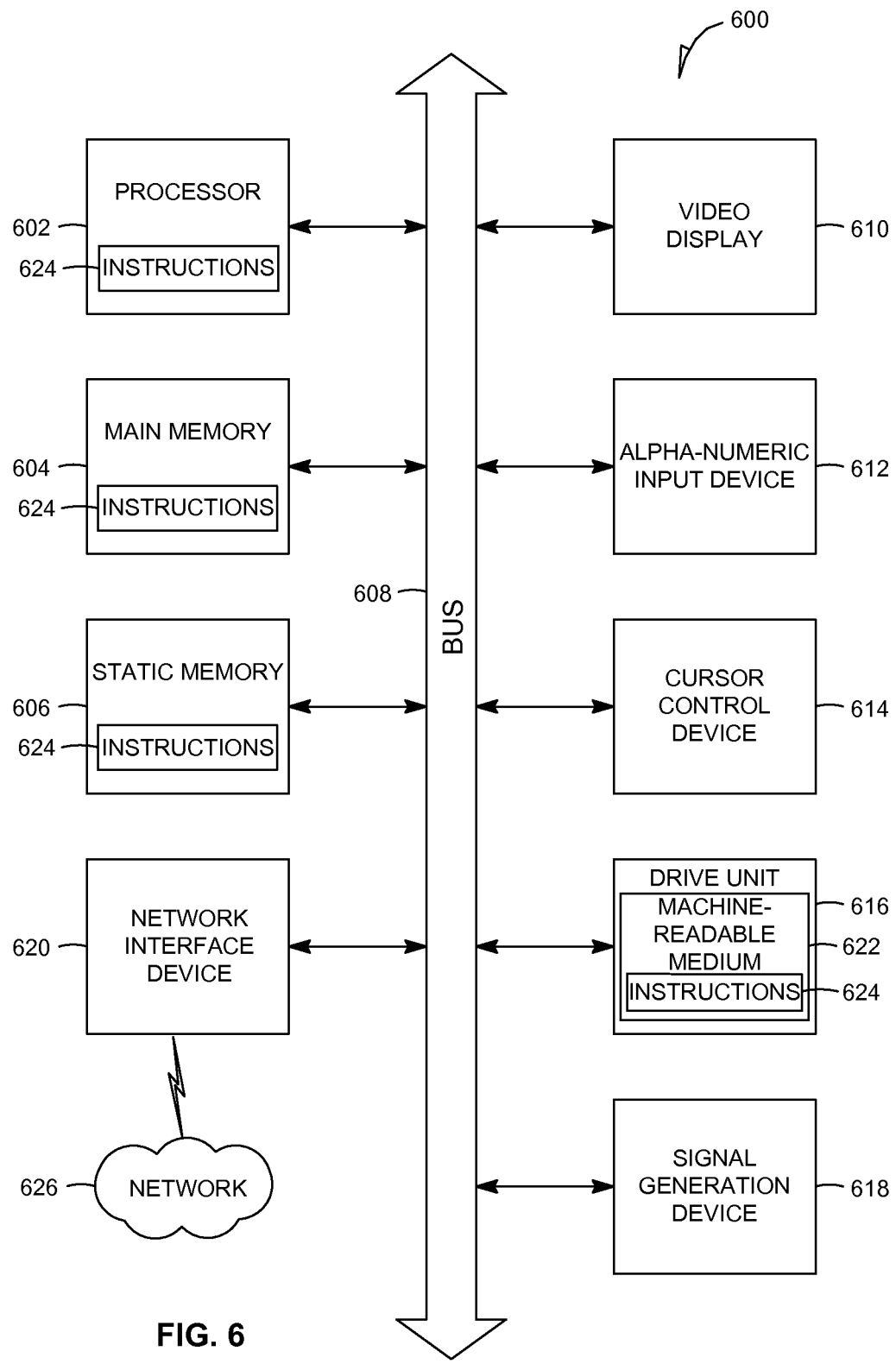
FIG. 6 illustrates a diagrammatic representation of a machine in the example form of a computer system within which a set of instructions may be stored and executed, for causing the machine to perform any one or more of the methodologies of FIG. 5 according to some embodiments.

FIG. 6 shows a diagrammatic representation of a machine in the example form of a computer system 600 within which a set of instructions, for causing the machine to perform any one or more of the methodologies discussed herein, may be executed. The computer system 600 comprises, for example, any of the device machine 110, device machine 112, applications servers 118, API server 114, web server 116, database servers 124, third party server 130, computing device 320, and/or server 322. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet, a set-top box (STB), a Personal Digital Assistant (PDA), a smart phone, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., liquid crystal display (LCD), organic light emitting diode (OLED), touch screen, or a cathode ray tube (CRT)). The computer system 600 also includes an alphanumeric input device 612 (e.g., a physical or virtual keyboard), a cursor control device 614 (e.g., a mouse, a touch screen, a touchpad, a trackball, a trackpad), a disk drive unit 616, a signal generation device 618 (e.g., a speaker) and a network interface device 620.

The disk drive unit 616 includes a machine-readable medium 622 on which is stored one or more sets of instructions 624 (e.g., software) embodying any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

It will be appreciated that, for clarity purposes, the above description describes some embodiments with reference to different functional units or processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), non-transitory, or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the scope of the invention.

What is claimed is:

1. A system, comprising:
    at least one memory;
    at least one sensor included in an item worn by a user; the at least one sensor to create first sensor data by directly measuring, via three dimensional (3D) death sensing, one or more physical dimensions of one or more body parts of the user while the item is worn by the user;
    at least one receiver to receive the first sensor data;
    a display;
    at least one processor in communication with each of the memory, the receiver, and the display; and
    one or more modules comprising instructions stored in the memory and executed by the processor to perform operations comprising:
        determining a user state based on the first sensor data that includes the body measurement data, and in response to a state change being satisfied by at least the user state, determining a recommendation that includes an article of clothing from an inventory to present on the display, the recommendation being determined based on the user state and a profile associated with the user.

2. The system of claim 1, wherein the receiver comprises a short-range receiver.

3. The system of claim 1, wherein the item comprises an article of clothing, accessory, jewelry, or shoes.

4. The system of claim 1; wherein the determining of the user state comprises identifying one or more of a physical activity, a physical environment, a physiological state, a body measurement, or a preferred fit measurement corresponding to the user.

5. The system of claim 1, wherein the recommendation that indicates the article of clothing from the inventory is determined based on the user state being body measurements and the profile being information about clothes owned by the user, wherein the article of clothing complements the clothes owned by the user and the certain size is determined according to the body measurements.

6. The system of claim 1, wherein the recommendation further indicates an item available for purchase from an inventory based on the user state being a physical activity or a physical environment associated with the user and the profile being information about personal property owned by the user.

7. A method for providing recommendations, the method comprising:
    creating first sensor data by directly measuring, via three dimensional (3D) depth sensing using at least one sensor included in an item worn by a user, one or more physical dimensions of one or more body parts of the user while the item is worn by the user;
    determining a user state based on the first sensor data that includes the body measurement data; and
    in response to a state change being satisfied by at least the user state, determining, using at least one processor; a recommendation that includes an article of clothing from an inventory to present on an electronic mobile device associated with the user; the recommendation being determined based on the user state and a profile associated with the user.

8. The method of claim 7, wherein the at least one sensor comprises a motion sensor, an accelerometer, a gyroscope; a temperature sensor, a moisture sensor, a pressure sensor, a contact sensor, an imaging sensor, a galvanic skin response sensor, a heat flux sensor, or an optical sensor.

9. The method of claim 7, wherein the determining of the user state comprises identifying one or more of a physical activity, a physical environment, a physiological state; a body measurement, or a preferred fit measurement corresponding to the user.

10. The method of claim 7, wherein the profile comprises information about clothes owned by the user, information about personal property owned by the user, music preferences associated with the user, health goals associated with the user, body goals associated with the user, past purchases associated with the user, contact information associated with the user, or baseline physiological data associated with the user.

11. The method of claim 7, further comprising communicating with a remote device to obtain additional data for use in determining the recommendation.

12. The method of claim 7, wherein the recommendation that indicates the article of clothing from the inventory is determined based on the user state being body measurements or preferred fit measurements and the profile being information about clothes owned by the user, wherein the article of clothing complements the clothes owned by the user and the certain size is determined according to the body measurements or preferred fit measurements.

13. The method of claim 7, wherein the recommendation further indicates an item available for purchase from an inventory based on the user state being a physical activity or a physical environment associated with the user and the profile being information about personal property owned by the user.

14. The method of claim 7, further comprising receiving a second sensor data corresponding to at least one sensor included in a second item wearable by the user, wherein the determining of the user state is based on the first and second sensor data, the user state comprising detection of both the item and the second item being worn by the user, and wherein the recommendation further indicates music recommendations in response to the determined user state.

15. The method of claim 14, wherein the profile comprises music preferences associated with the user.

16. The method of claim 7, wherein the recommendation further indicates one or more tips for weight loss based on the user state being inactivity or weight change and the profile comprising information about previous physical activities or weight, and wherein the at least one sensor comprises a pressure sensor embedded in shoes worn by the user or contact sensors embedded in a waistband of the item worn by the user.

17. A non-transitory computer readable medium including instructions, when executed by a processor, causes the processor to perform operations comprising:
creating first sensor data by directly measuring, via three dimensional (3D) depth sensing using at least one sensor included in an item worn by a user, one or more physical dimensions of one or more body parts of the user while the item is worn by the user;
determining a user state based on the first sensor data that includes the body measurement data; and
in response to a state change being satisfied by at least the user state, determining a recommendation that includes an article of clothing from an inventory to present on an electronic mobile device associated with the user, the recommendation being determined based on the user state and a profile associated with the user.

* * * * *